US012802479B2

(12) United States Patent
Li et al.

(10) Patent No.: US 12,802,479 B2
(45) Date of Patent: Nov. 17, 2026

(54) PRIVACY-PRESERVING TRAINING AND EVALUATION OF COMPUTER VISION MODELS

(71) Applicant: Amazon Technologies, Inc., Seattle, WA (US)

(72) Inventors: Kun Li, Sammamish, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 272 days.

(21) Appl. No.: 18/214,108

(22) Filed: Jun. 26, 2023

(65) Prior Publication Data

US 2024/0428605 A1 Dec. 26, 2024

(51) Int. Cl.

| | |
|---|---|
| ***G06V 30/19*** | (2022.01) |
| ***G06V 20/62*** | (2022.01) |
| ***G06V 20/70*** | (2022.01) |
| ***G06V 30/14*** | (2022.01) |
| ***G06V 30/148*** | (2022.01) |
| ***G06V 30/30*** | (2022.01) |

(52) U.S. Cl.

CPC ........ *G06V 30/19147* (2022.01); *G06V 20/62* (2022.01); *G06V 20/70* (2022.01); *G06V 30/1448* (2022.01); *G06V 30/15* (2022.01); *G06V 30/30* (2022.01)

(58) Field of Classification Search

CPC .. G06V 30/19147; G06V 20/62; G06V 20/70; G06V 30/1448; G06V 30/15; G06V 30/30; G06V 30/412; G06V 30/414; G06F 21/6245

See application file for complete search history.

(56) References Cited

U.S. PATENT DOCUMENTS

2014/0376819 A1* 12/2014 Liu .......................... G06T 7/187 382/205
2019/0096060 A1* 3/2019 Zhang ................... G06T 7/0014
2020/0380162 A1* 12/2020 Eisen .................... G06F 40/131
2021/0326537 A1* 10/2021 Liu ...................... G06F 21/6245
2021/0357512 A1* 11/2021 Busila .................. G06V 30/414
2021/0397737 A1* 12/2021 De Berker ............ G06F 18/214

OTHER PUBLICATIONS

Di Vimercati et al.; Artifact: Scalable Distributed Data Anonymization; IEEE International Conference on Pervasive Computing and Communications; 2021; pp. 450-451.

Exner; International Search Report and Written Opinion of PCT/US2024/033282; Sep. 24, 2024; 14 pgs.

* cited by examiner

*Primary Examiner* — Huo Long Chen
(74) *Attorney, Agent, or Firm* — K&L Gates LLP

(57) ABSTRACT

Devices and techniques are generally described for privacy preservation for computer vision models. In some examples, a first field of text and a second field of text may be detected in a first image. A first alpha-numeric text string may be detected in the first field and a second alpha-numeric text string may be detected in the second field. A first sub-image including the first alpha-numeric text string may be generated and a second sub-image including the second alpha-numeric text string may be generated. The first sub-image may be sent to a first computing device for annotation and the second sub-image may be sent to a second computing device for annotation.

18 Claims, 8 Drawing Sheets

PRIVACY-PRESERVING TRAINING AND EVALUATION OF COMPUTER VISION MODELS

BACKGROUND

In order to comply with various government regulations and best practices, stewards of data are required to maintain strict control over the usage, distribution, handling, and retention of personal data related to individuals. In various examples, this includes instituting capabilities to retrieve and present all personal data on demand, delete all personal data on demand, and adhere to complicated time- and rules-based retention and deletion schedules for personal data.

DETAILED DESCRIPTION

Figure 1:
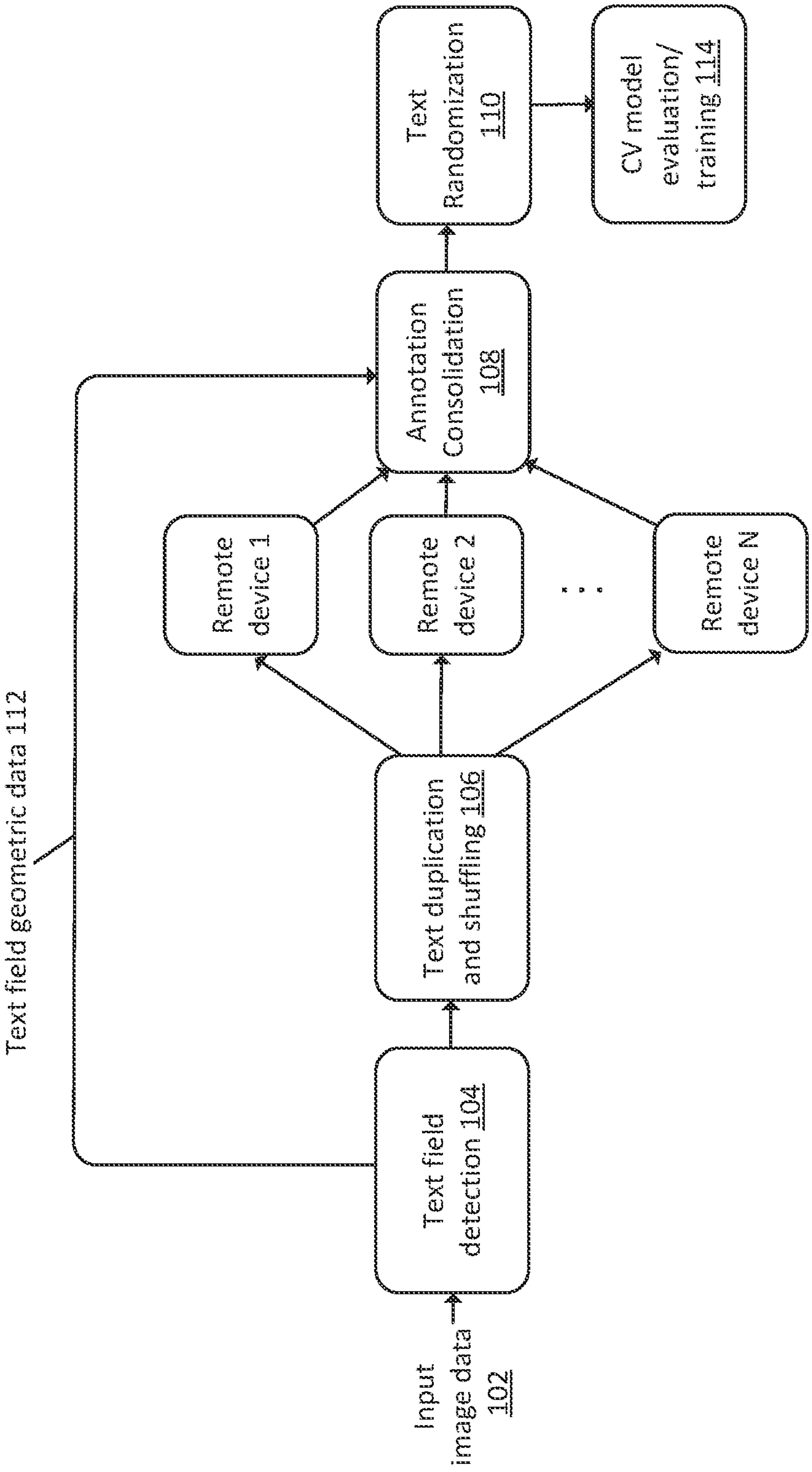
FIG. 1 is a flow diagram illustrating an example system that may be used to preserve privacy during training and/or evaluation of computer vision models, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Storage and/or use of data related to a particular person or entity (e.g., personally identifiable information and/or other sensitive data) may be required to comply with regulations, privacy policies, and/or legal requirements of the relevant jurisdictions. In many cases, users may be provided with the option of opting out of storage and/or usage of personal data and/or may select particular types of personal data that may be stored while preventing aggregation and storage of other types of personal data. Additionally, aggregation, storage, and/or use of personal data may be compliant with privacy controls, even if not legally subject to them. For example, storage and/or use of personal data may be subject to acts and regulations, such as the Health Insurance Portability and Accountability Act (HIPAA), the General Data Protection Regulation (GDPR), and/or other data privacy frameworks.

Maintaining the integrity and confidentiality of sensitive data (e.g., health data related to an individual, sensitive financial information, etc.) involves employment of specific measures against accidental loss, and unauthorized or unlawful processing of such data. Personally Identifiable Information (PII) is data relating directly or indirectly to an individual, from which the identity of the individual can be determined. Examples of PII include patient names, addresses, phone numbers, Social Security numbers, bank account numbers, etc. Images and videos of insurance cards, driver licenses, prescriptions, pill bottle labels, passports, and medical bills typically include PII.

This makes it very difficult to develop, test, and deploy machine learning algorithms that detect and extract names, address, phone numbers, and other PII from image data (e.g., single images, video frames, and videos). For example, although existing computer vision algorithms are easily able to detect various text and fields in an image (e.g., an image of a driver's license) and use such information to auto-populate a user's account (assuming all applicable user permissions), the data used to develop, test, and deploy such machine learning models have to be stored, transmitted, and processed in a secure manner. As such, it may be cumbersome to deploy such models in practice as numerous security protocols may need to be adhered to in order to preserve user privacy and/or to prevent improper usage and/or storage of sensitive data.

In various cases, such computer vision algorithms are tested and validated for performance in secure environments-which can often make the process cumbersome, time consuming, restrictive, and complex. For example, the processing pipelines, libraries, services, storage, and/or network handling for the data may add to security risks. Described herein are systems and techniques that may be used to process, store, and transfer the image data (which may include sensitive data such as PII) while maintaining privacy and security of such data. In addition the techniques described herein are able to train, test, and deploy such computer vision models using techniques that do not add to the overall cost or latency of model training or deployment relative to conventional approaches which may not offer such data security.

In various examples, object detectors are computer vision machine learning models that are able locate and/or classify objects detected in frames of image data. Typically, the output of an object detector model is a "bounding box" or "region of interest" surrounding a group of pixels and a label (label data) classifying that bounding box or region of interest to a particular class for which the object detector has been trained. For example, an object detector may be trained to classify dogs and cats. If an input image includes first pixels representing a dog and second pixels representing a cat, the object detector may output two bounding boxes (e.g., output bounding box data). The first bounding box may surround the first pixels and may be labeled as "dog." Similarly, the second bounding box may surround the second pixels and may be labeled as "cat." In some other examples, an object detector may be trained to detect text present in an image. The object detector may provide bounding boxes or may otherwise identify regions in the image in which text is detected.

Bounding boxes may be of any shape. For example, bounding boxes are rectangular and may be defined by the four pixels addresses that correspond to the corners of the bounding box. In some examples, bounding boxes are defined by a perimeter of pixels surrounding pixels predicted to correspond to some object which the object detector has been trained to detect. More generally, object detectors may detect regions of interest (RoIs). Bounding boxes are one example of an RoI that may be detected by an object detector. However, RoIs may be defined in other ways apart from bounding boxes. For example, pixels corresponding to a detected object may be classified to distinguish these pixels from those pixels representing other objects. An object detector may be implemented using a convolutional neural network (CNN), a vision transformer, etc.

For example, in order to generate a training dataset that is able to automatically process user health insurance information, it may not be possible to provide an image of a user's insurance card to an annotator and/or annotation system to have the relevant text data (e.g., Insurance Policy Number, User name, Group Number, etc.) annotated for privacy and security reasons. Described herein are various systems and techniques for privacy-preserving training and evaluation of computer vision models. In various examples, the approaches may involve fragmentation of an image into a plurality of sub-images so that any information in a smaller image fragment (sub-image) cannot be used to identify or determine any sensitive information about a person to which the overall image pertains. For example, an image with potential PII information is fragmented or cut into random sub-images. Each sub-image may represent a smaller segment of the entire image thereby ensuring that any PII information cannot be recovered from the smaller sub-image. The front end processing of an image involves detection of contiguous text and breaking up the image such that the contiguous text is fragmented—thereby guaranteeing privacy and security. These fragmented sub-images may be annotated and/or otherwise processed using normal annotation/processing pipelines without loss of security/privacy. After annotation, the sub-images may be consolidated to reassemble the original image using geometrical information describing the position/orientations/locations of the fragments within the original image. Such annotated images may be used to develop (e.g., train) and deploy image processing algorithms such as optical character recognition (OCR), segmentation, detection, classification of objects without the need to harden the systems to maintain security.

Machine learning techniques, such as those described herein, are often used to form predictions, solve problems, recognize objects in image data for classification, etc. For example, in the context of object detection/classification, a machine learning architecture may learn to analyze input images, detect various object classes (e.g., cats, dogs, text fields, etc.), and/or distinguish between instances of objects appearing in the images. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters (weights) control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a flow diagram illustrating an example system that may be used to preserve privacy during training and/or evaluation of computer vision models, in accordance with various aspects of the present disclosure. Input image data 102 may be an image that may include various text (including potentially sensitive data, such as PII). The input image data 102 may be one or more frames of a video, a single image, or multiple images.

Text field detection 104 may involve detecting contiguous text within the input image data 102. In various examples, individual text fields may be detected for each grouping of contiguous alpha-numeric characters (e.g., characters without a space). Accordingly, "12345" in an image may be detected as a single text field, while "John Smith" may be detected as two contiguous text fields (one field for "John" and another field for "Smith"). Other techniques to fragment detected text fields may be used, depending on the desired implementation. For example, contiguous text may be broken up into fragments of four (or any other desired number) or fewer contiguous characters. In various examples the alpha-numeric text of a given field may be fragmented into fragments that include less than a total amount of the text detected in the field.

The text field detection 104 may be performed using a pre-trained optical character recognition (OCR) component, an object detector trained to detect text, etc. Text field geometric data 112 may include information describing the location (e.g., within the image frame), the skew, and/or the three-dimensional rotation (e.g., the angle of rotation of text shown in an image with respect to one or more axes), of each text field detected in the image. As described in further detail below, the text field geometric data 112 may be used to recreate the input image data 102 from fragments of the input image data 102 made up of sub-images of each detected text field and the background (non-text portions) of the original input image data 102. In various examples, an affine transformation may be performed on the sub-images of the detected text fields and the background in order to generate a new two dimensional image version of the original input image data 102 (e.g., to correct for a poor camera angle used to capture an image of a surface on which the text is printed).

Text duplication and shuffling 106 includes generation of a sub-image of the text of each detected text field detected at 104. Accordingly, for each detected contiguous alpha-numeric string of text a sub-image may be generated. The sub-images may be sent to various different remote devices for annotation. Annotation may include for example, verifying that text detected by a computer vision model for the sub-image is accurate with respect to the sub-image of the text. In some other examples, annotation may include having an annotator type the alpha-numeric string shown in the sub-image. Advantageously, by sending the different sub-images to different computing devices and/or different annotators privacy is maintained as any given computing device/annotator only has access to that specific contiguous alpha-numeric string without any other context that may be used to ascertain PII or sensitive information.

Annotation consolidation 108 may receive the annotated text fields from the remote devices 1, 2, . . . , N and the text field geometric data 112. In addition, the annotation consolidation 108 may generate and/or receive a background image of the input image data 102 with the detected text removed (but with locations of the various text fields detected at text field detection 104 known). In some examples, annotation consolidation 108 may store a reassembled version of the input image data 102 that includes the various detected and annotated text fields. Such reconstituted images may be used to train or re-train an object detector, an OCR model, and/or some other computer vision model.

Since the various text fields, the alpha-numeric text strings within those fields, and the respective locations of such fields are known, text randomization 110 may be used to replace the alpha-numeric text strings with randomized alpha-numeric text strings (e.g., fake information that does not divulge any PII) while maintaining the formatting of the input image. In various examples, in order to maintain the characteristics of the alpha-numeric text strings, computer-implemented logic may be used that replaces a given character with a random character of the same type. For example, capital letters of the alphabet may be replaced with random capital letters of the same alphabet, while lower-case letters of the alphabet may be replaced with random lower-case letters of the same alphabet. For example, text randomization may replace the alpha-numeric text string "A2z4" with the alpha-numeric text string "L1b7" and may replace the alpha-numeric text string "Susan" with the alpha-numeric text string "Bagrf." In this way, alpha-numeric text strings for particular fields maintain the same length (in terms of numbers of characters) and other characteristics without divulging sensitive and/or personally-identifiable information. Once the text has been randomized in this way, the image that includes randomized alpha-numeric text in the detected text fields may be sent to an annotator that may annotate the text fields with their corresponding attribute type (e.g., a field that includes a randomized user's name may be identified as a "Name" field, while a field that includes a randomized account number may be identified as an "Account Number" field). These techniques are described in further detail below.

Upon receiving all relevant annotations (e.g., of the alpha-numeric text itself and/or of the attribute types for the various fields detected in the input image data 102) the annotated data may be incorporated into a training data set and used to train/re-train the relevant computer vision model (s) at block 114. In various other examples, the annotations may be used to evaluate the performance of the relevant computer-vision model(s). For example, the accuracy/precision/recall of a computer vision model may be evaluated based on its ability to correctly detect text or detect a particular type of text field from input image data.

Figure 2A:
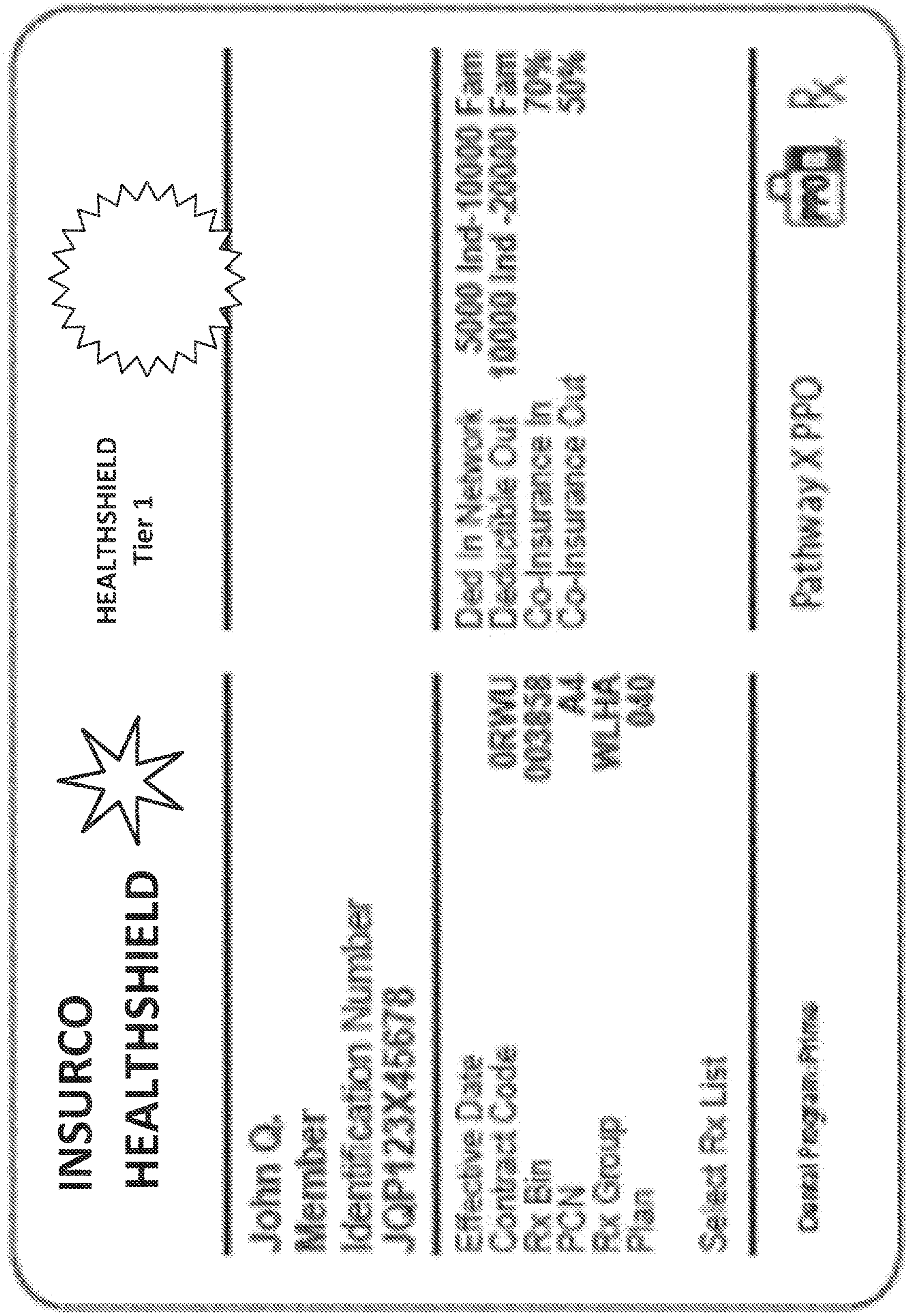
FIG. 2A illustrates an example of raw image data including potentially sensitive and/or personally identifiable information, in accordance with various examples described herein.

FIG. 2A illustrates an example of raw image data including potentially sensitive and/or personally identifiable information, in accordance with various examples described herein. The example image in FIG. 2A is an insurance card that may include PII such as the card-holder's name, ID number, etc. It may be impermissible to directly send such an image to an annotator and/or annotator's may be required to be specifically vetted, trained, and/or evaluated in order to handle such sensitive data.

Figure 2B:
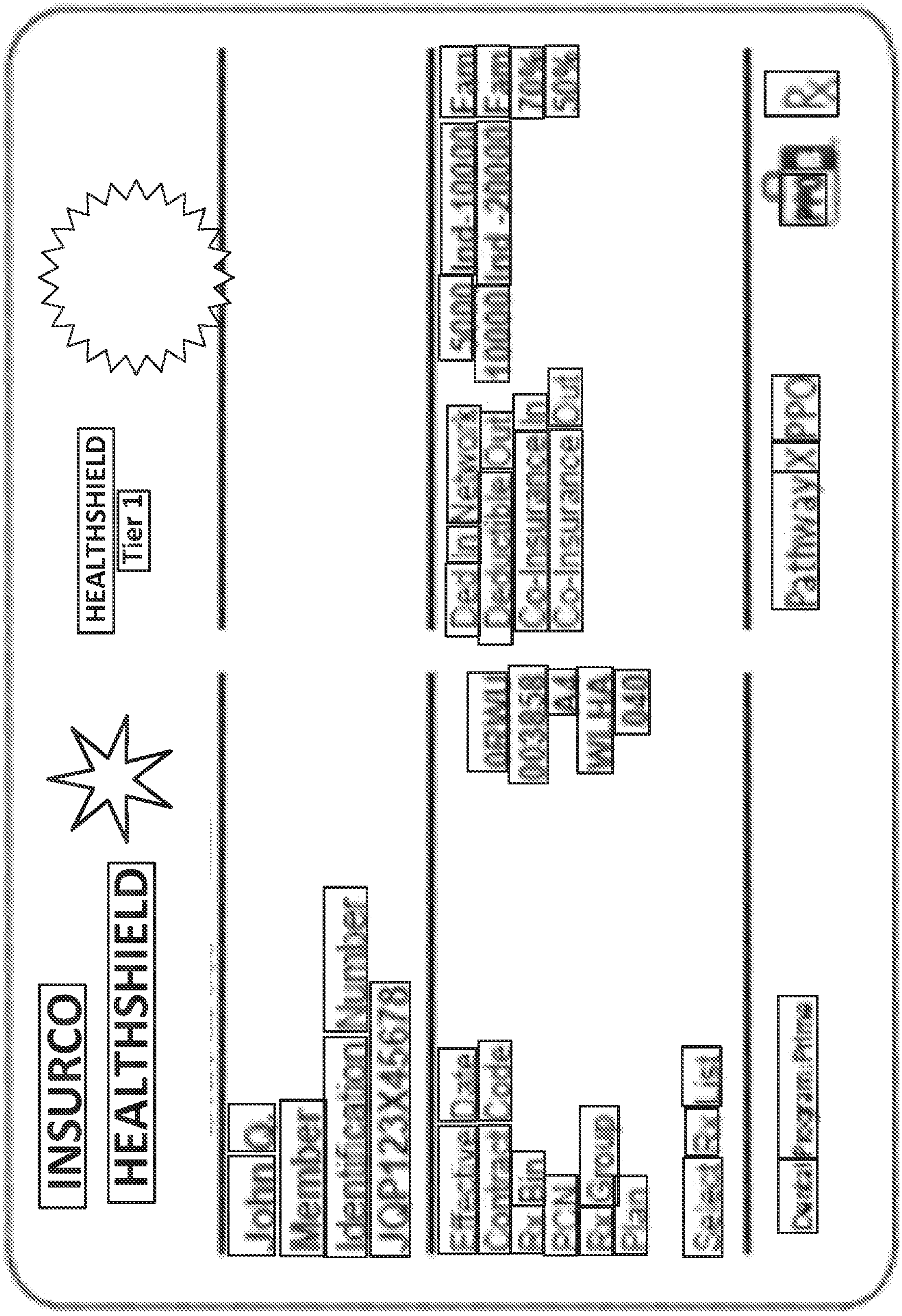
FIG. 2B illustrates the example image data of FIG. 2A including text field detection, in accordance with various examples described herein.

FIG. 2B illustrates the example image data of FIG. 2A including text field detection, in accordance with various examples described herein. In the example of FIG. 2B, text field detection 104 may have been performed using a pre-trained optical character recognition (OCR) model, an object detector trained to detect text, etc. As shown, individual text fields have been detected for each grouping of contiguous alpha-numeric characters (e.g., characters without a space). The detections are represented using respective bounding boxes in FIG. 2B. Accordingly, the identification number "JQP123X45678" has been detected as a single text field, while "John Q" has been detected as two contiguous text fields (one field for "John" and another field for "Q"). Other techniques to fragment detected text fields may be used, depending on the desired implementation. For example, contiguous text may be broken up into fragments of four (or any other desired number) or fewer contiguous characters.

Figure 2C:
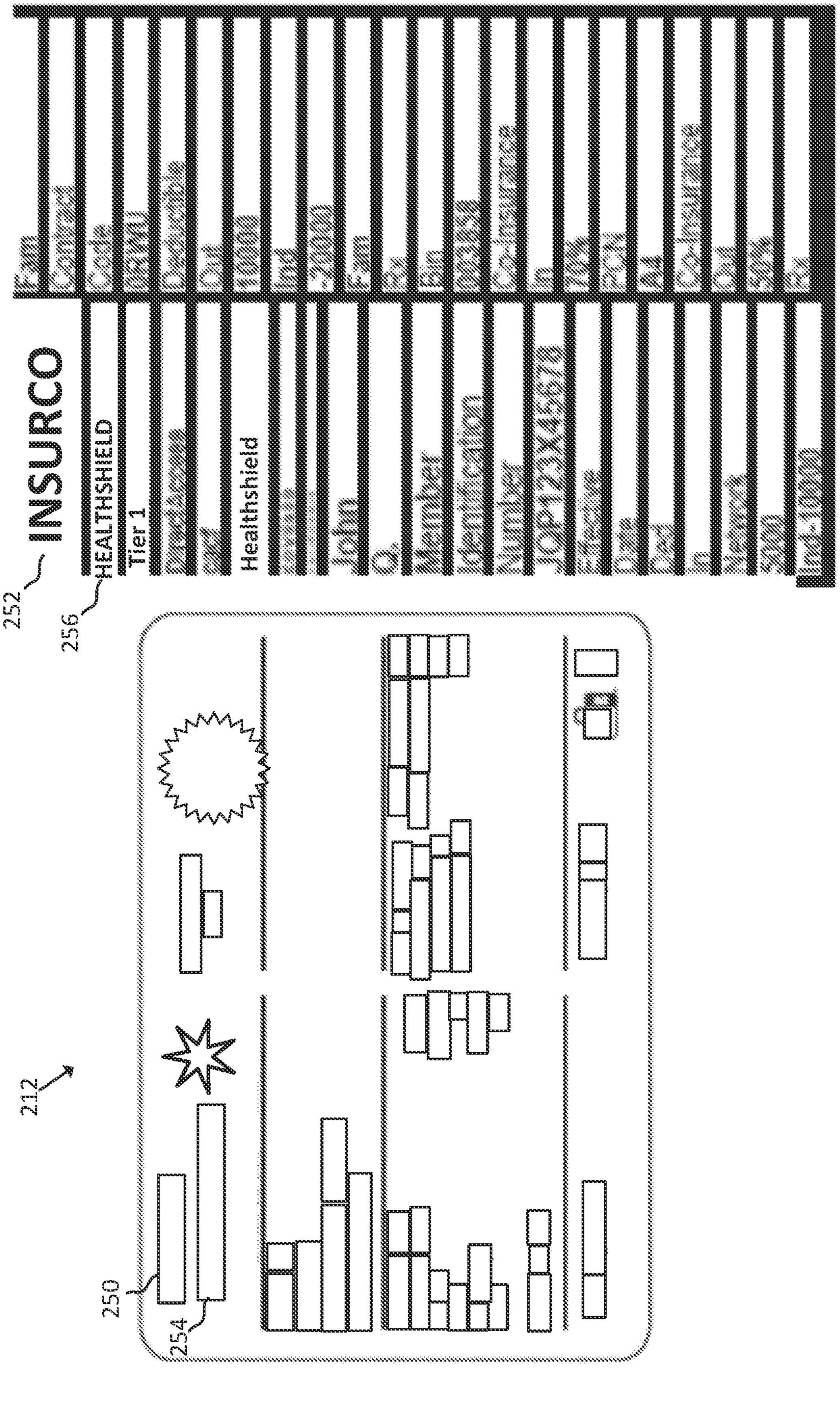
FIG. 2C illustrates sub-images of alpha-numeric text strings generated for each text field detected in FIG. 2B and a background image with detected text removed, in accordance with various examples described herein.

FIG. 2C illustrates sub-images of alpha-numeric text strings generated for each text field detected in FIG. 2B and a background image with detected text removed, in accordance with various examples described herein. For each detected text field in FIG. 2B, a sub-image may be generated representing the alpha-numeric text in that field. For example, for text field 250, a sub-image 252 representing the alpha-numeric text string "INSURCO" has been generated. Similarly, for text field 254, a sub-image 256 representing the alpha-numeric text string "HEALTHSHIELD" has been generated. Background image 212 may also be generated which may include blank versions of the detected text fields. The blank detected fields may be represented as the text field geometric data 112 from FIG. 1. In some examples, the background image 212 may be sent to an annotator for annotation of any undetected text field which remained in the background image 212. Such annotations may be used to improve the text field detection 104 (e.g., by retraining the object detector, OCR model, or other text detector used to detect the text in the input image).

Figure 2D:
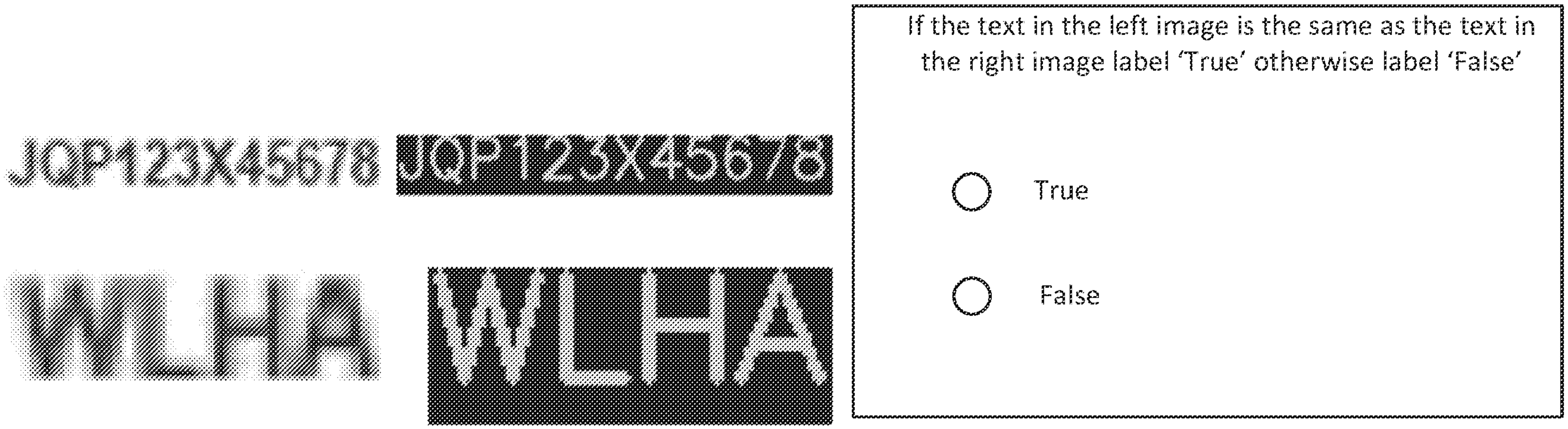
FIGS. 2D and 2E illustrate example annotation interfaces that may be used in accordance with the examples depicted in FIGS. 2A-2C, in accordance with various aspects of the present disclosure.
Figure 2E:
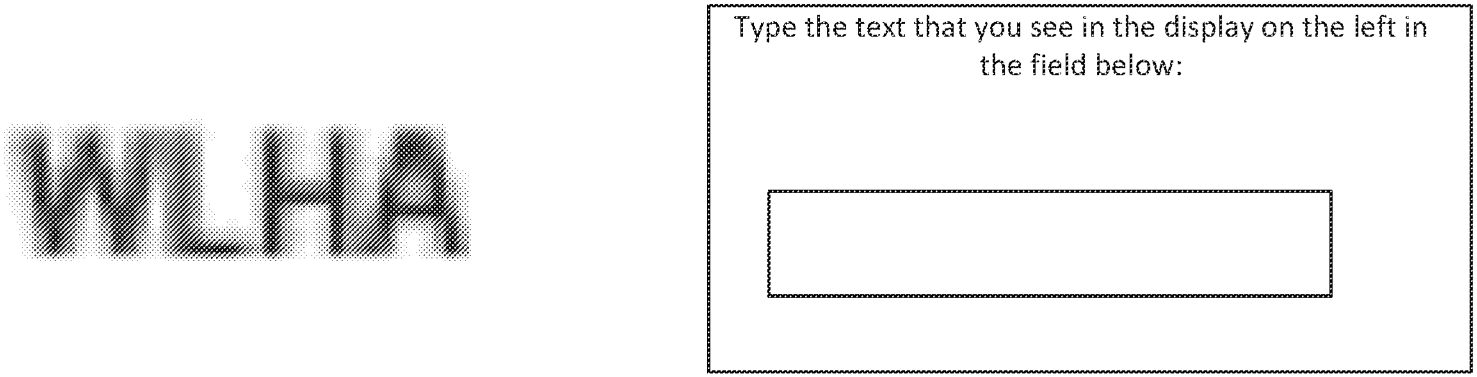

FIGS. 2D and 2E illustrate example annotation interfaces that may be used in accordance with the examples depicted in FIGS. 2A-2C, in accordance with various aspects of the present disclosure. The various sub-images of alpha-numeric text strings generated for each text field detected in FIG. 2B may be sent to various different remote computing devices for annotation. Since any given computing device/annotator will receive only the sub-image of a text fragment without receiving any larger context from the overall input image data, privacy of the underlying data is preserved. In the example in FIG. 2D, the sub-image of the text is presented (e.g., the blurred text on the left-hand side detected from a blurry user-captured image) alongside an OCR model's prediction of the alpha-numeric string represented in that sub-image (the text on the right-hand side). For each such pairing of a sub-image together with the predicted text represented in that sub-image, the annotator may be provided with an interface in which the annotator may indicate whether there is a match between the alpha-numeric string in the sub-image and the alpha-numeric string detected by the OCR model (or other text detection model). This information may be used to evaluate the model performance of the OCR or other text detection model.

In the example interface in FIG. 2E, the annotator is presented with the sub-image of the alpha-numeric string and is asked to type the alpha-numeric string represented in the sub-image in the provided field in the graphical user interface. This annotation may be used as a ground truth label to train the OCR model or other text recognition model (e.g., using supervised machine learning techniques).

Figure 2F:
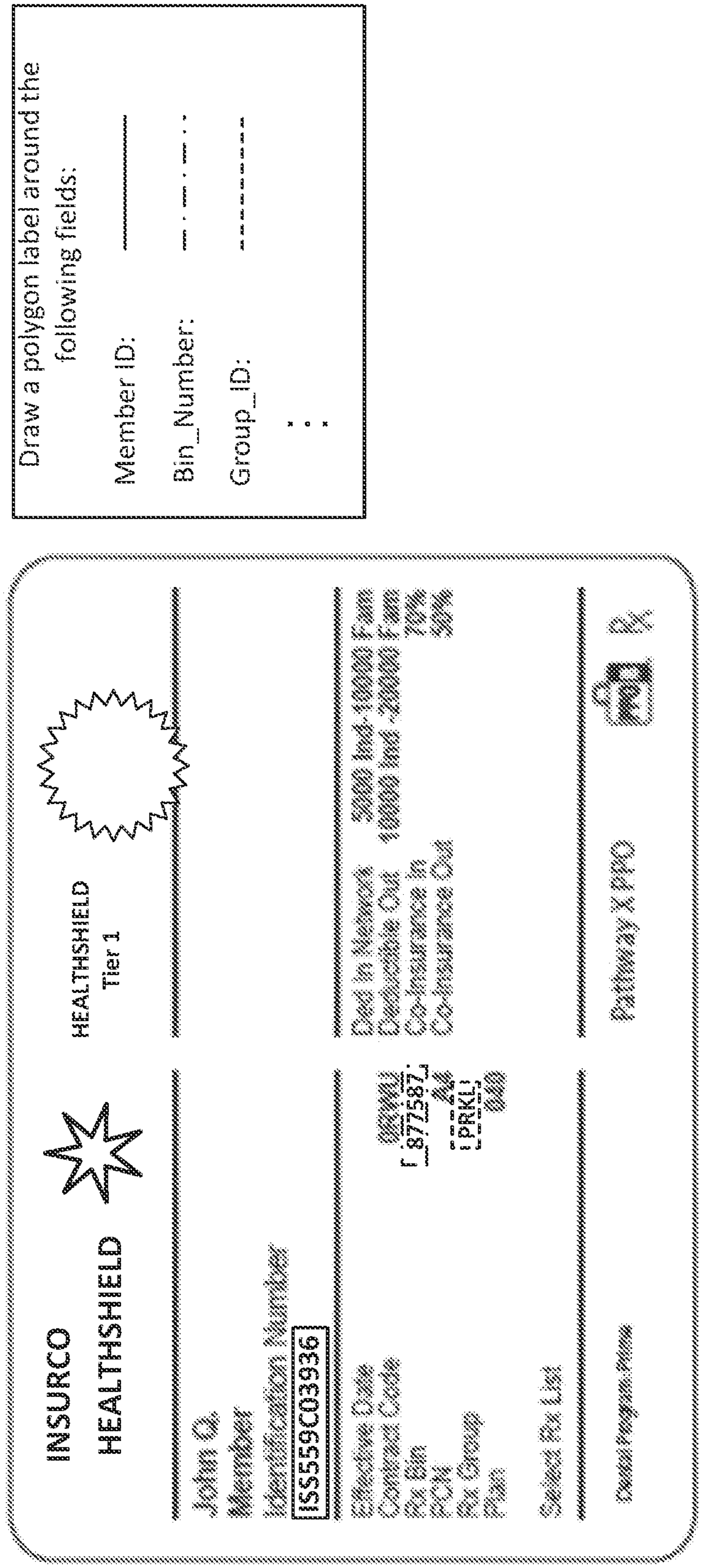
FIG. 2F illustrates an example field attribute type annotation interface image with randomized alphanumeric strings, in accordance with various aspects of the present disclosure.

FIG. 2F illustrates an example field attribute type annotation interface image with randomized alphanumeric strings, in accordance with various aspects of the present disclosure. After detecting the relevant text fields and removing the alpha-numeric text strings to generate the background image 212, the text fields may be replaced with random (or pseudo-random) alpha-numeric text strings as described above in reference to text randomization 110. In the example of FIG. 2F, the alpha-numeric text of various text fields has been replaced with random alpha-numeric text. For example, the identification number from FIG. 2A (JQP123X45678) has been replaced with a pseudo-random identification number (ISS559C03936). Note that the pseudo-random identification number includes the same number of characters as the real identification number and replaces upper-case alphabet letters with random upper-case alphabet letters and numbers with random numbers. Such randomized data may be presented to an annotator along with a graphical user interface instructing the annotator to provide bounding box (or other polygonal) annotation to identify attribute types of certain fields. In the example in FIG. 2F, the annotator has been asked to identify the "Member ID" field, the "Bin_Number" field, and the "Group_ID" field and to annotate them using different patterned bounding boxes, as shown. Because the alpha-numeric values displayed in such fields are random values, no sensitive data is divulged. Field attribute type annotation may be used to train an object detector or other computer vision to detect fields of the relevant type in input image data.

Figure 3:
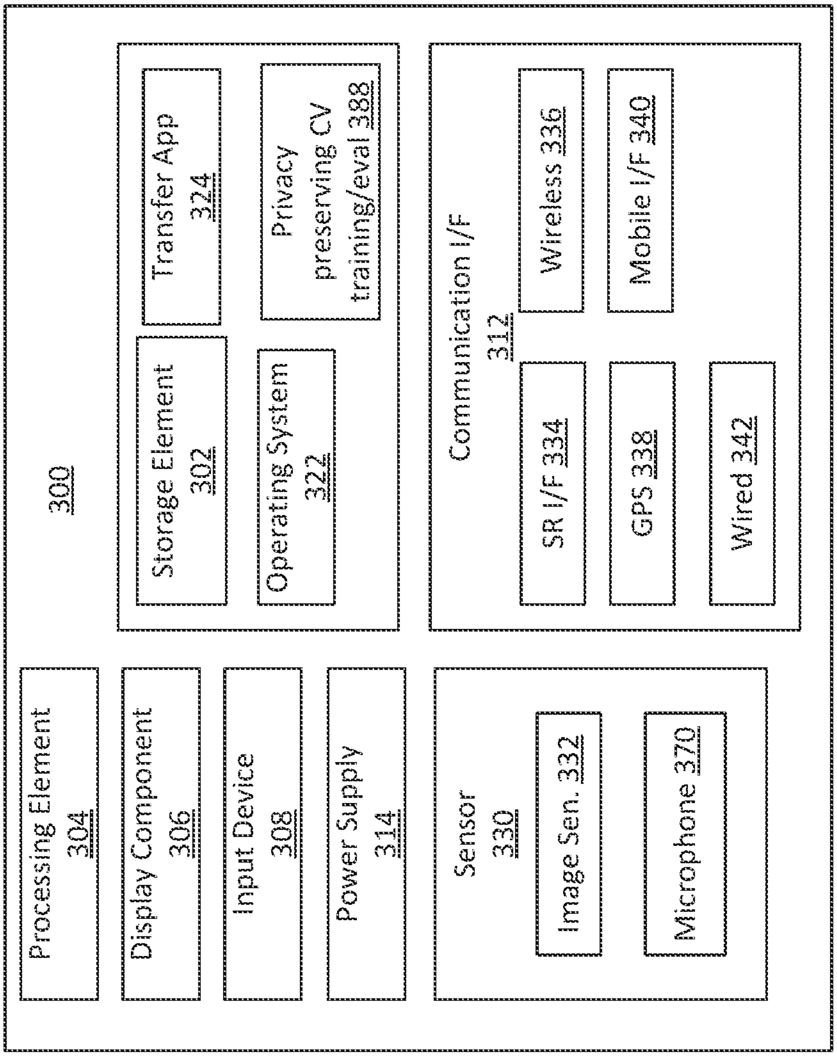
FIG. 3 is a block diagram showing an example architecture of a computing device that may be used in accordance with various embodiments described herein.

FIG. 3 is a block diagram showing an example architecture of a computing device that may be used in accordance with various embodiments described herein. It will be appreciated that not all devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to determine a wakeword and/or to stream audio data to a speech processing system. The storage element 302 can include one or more different types of non-transitory computer-readable memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc. In various examples, the storage element 302 may comprise instructions effective to program at least one processor to implement a privacy-preserving CV training/evaluation algorithm 388 such as the example process flow described above in reference to FIGS. 1-2F.

The storage element 302 may also store software for execution by the processing element 304. An operating system 322 may provide the user with an interface for operating the computing device and may facilitate communications and commands between applications executing on the architecture 300 and various hardware thereof. A transfer application 324 may be configured to receive images, audio, and/or video from another device (e.g., a mobile device, image capture device, and/or display device) or from an image sensor 332 and/or microphone 370 included in the architecture 300. In some examples, the transfer application 324 may also be configured to send the received voice requests to one or more voice recognition servers. Architecture 300 may store parameters and/or computer-executable instructions effective to implement the object detectors, OCR models, and/or other computer vision models, as desired.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 306 may be effective to display content determined provided by a skill executed by the processing element 304 and/or by another computing device.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 or an array of microphones for capturing sounds, such as voice requests.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other computing devices. For example, the communication interface 312 may comprise a wireless communication module 336 configured to communicate on a network, such as a computer communication network, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. An example of an image sensor 332 may be a camera configured to capture color information, image geometry information, and/or ambient light information.

Figure 4:
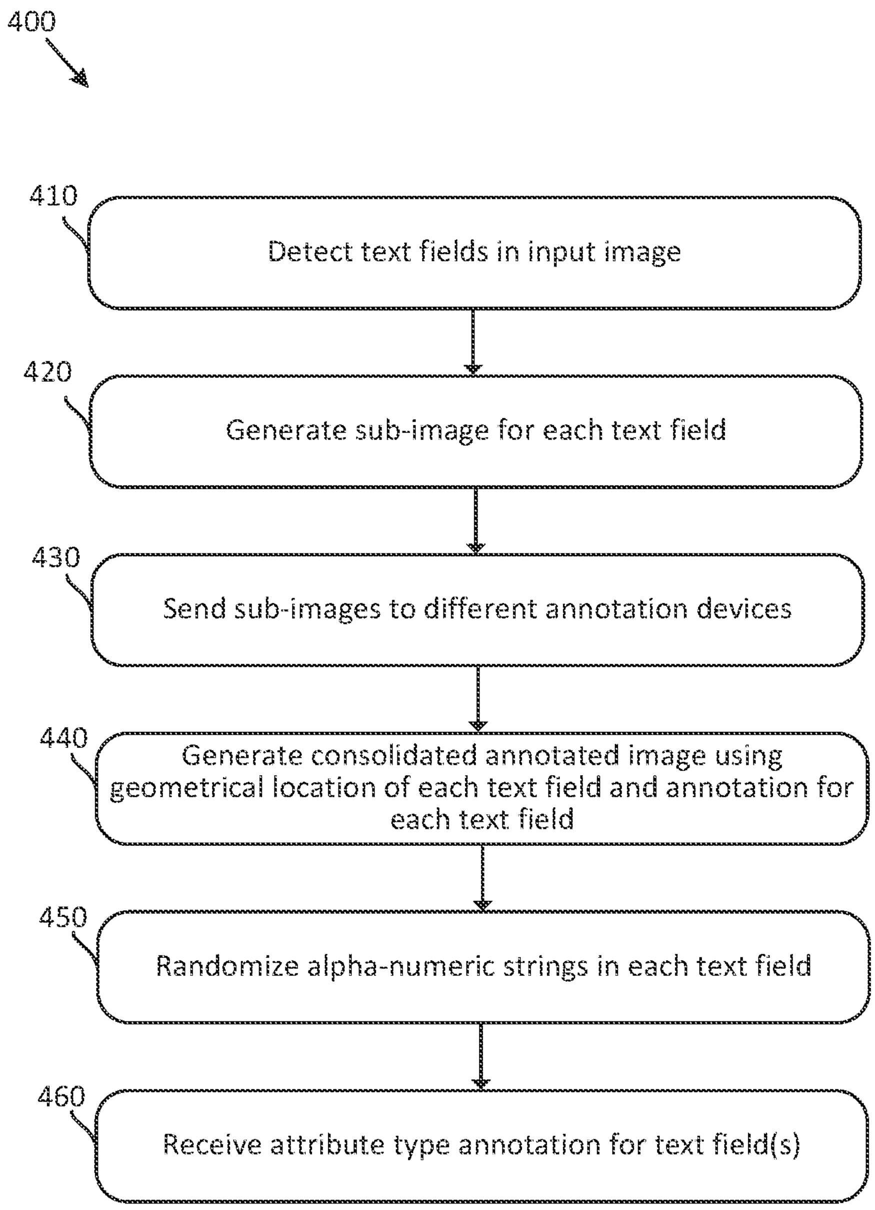
FIG. 4 depicts an example process for privacy preservation for computer vision model training and/or evaluation, in accordance with various aspects of the present disclosure.

FIG. 4 depicts an example process 400 for privacy preservation for computer vision model training and/or evaluation, in accordance with various aspects of the present disclosure. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which text fields in an input image may be detected (e.g., using an object recognition model (e.g., a CNN, vision transformer, R-CNN, etc.) and/or an OCR model). Any size or quantum of text fragments may be detected according to the desired implementation. For example, an object detector and/or OCR model may detect contiguous alpha-numeric characters present in the input image.

Processing may continue at action 420, at which a sub-image may be generated for each of the detected text fields. Individual sub-images may be shuffled so that they are not ordered in accordance with any specific pattern. In addition, geometric data indicating the position of the text field in the input image from which the sub-image was extracted may be stored and maintained in non-transitory computer-readable memory. As previously described, the geometric data may include 3D rotation information, two dimensional coordinate information, geometric transform data, etc.

Processing may continue at action 430, at which the generated sub-images may be sent to different annotation devices. For example, the sub-images represented the detected text fields may be sent to different annotators and/or remote computing devices so that no one annotator/remote computing device receives all the information from the input image.

At action 440, consolidated annotated image data may be generated using the location of each detected text field (e.g., as represented by text field geometric data 112), the background image, the sub-images, and the annotation for each of the detected text fields received from the annotators. Processing may continue at action 450, at which randomized alpha-numeric strings may be used to populate one or more of the text fields in the image (e.g., the background image) and/or may replace one or more alpha-numeric text strings in the image.

Processing may continue at action 460, at which attribute type annotation may be received for the text fields including the randomized alpha-numeric strings. For example, annotators may annotate the randomized text fields with attribute types describing the fields (e.g., a field including a user's name may be annotated as a "User Name" field, even though no actual user name is present in the field, only randomized text). Such attribute type annotations may be used to train an object detector to detect different attribute types corresponding to different fields for newly-input unannotated images.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:

generating, by fragmenting a first image, a first sub-image, wherein the first sub-image includes a first segment of personally-identifiable information (PII), wherein the first segment comprises a partially-complete portion of first PII in a first field from which the first segment of PII is determined;

generating, by fragmenting the first image, a second sub-image, wherein the second sub-image includes a second segment of PII, wherein the first segment comprises a partially-complete portion of second PII in a second field from which the second segment is determined;

determining a first alpha-numeric text string in the first field;

determining a second alpha-numeric text string in the second field;

receiving, from a first annotator, first label data for the first sub-image, based on the first alpha-numeric text string;

receiving, from a second annotator, second label data for the second sub-image, based on the second alpha-numeric text string;

generating, by combining the first sub-image and the second sub-image, second image data, wherein the second image data represents a background of the first image with the first alpha-numeric text string removed from the first field and the second alpha-numeric text string removed from the second field; and generating modified second image data by populating the first field in the second image data with a first randomized alpha-numeric text string and the second field in the second image data with a second randomized alpha-numeric text string.

2. The computer-implemented method of claim 1, further comprising:

generating second image data, wherein the second image data represents a background of the first image with the first alpha-numeric text string removed from the first field and the second alpha-numeric text string removed from the second field; and receiving a first bounding box annotation from the first annotator, the first bounding box annotation representing a text field present in the first image undetected by the OCR component.

3. The computer-implemented method of claim 1, further comprising:

receiving a first bounding box annotation from the first annotator for the second image data, the first bounding box annotation defining an attribute type for the first field.

4. The computer-implemented method of claim 1, further comprising training a first computer vision model based at least in part by:

generating a first prediction by the first computer vision model for the first sub-image;

comparing the first prediction to the first label data;

generating a second prediction by the first computer vision model for the second sub-image; and comparing the second prediction to the second label data.

5. A computer-implemented method comprising:

generating, by fragmenting a first image, a first sub-image, wherein the first sub-image includes a first segment of personally-identifiable information (PII), wherein the first segment comprises a partially-complete portion of first PII in a first field from which the first segment is determined;

generating, by fragmenting the first image, a second sub-image, wherein the second sub-image includes a second segment of PII wherein the second segment comprises a partially-complete portion of second PII in a second field from which the second segment of PII is determined;

determining a first alpha-numeric text string in the first field;

determining a second alpha-numeric text string in the second field;

sending the first sub-image to a first computing device for annotation;

sending the second sub-image to a second computing device for annotation;

generating, based on a combination of the first sub-image and the second sub-image, second image data representing a background of the first image with text removed;

determining first bounding box data representing a location of the first field in the second image data;

determining second bounding box data representing a location of the second field in the second image data; and generating third image data based at least in part on inserting a third alpha-numeric text string in the first field in the second image data and inserting a fourth alpha-numeric text string in the second field in the second image data.

6. The computer-implemented method of claim 5, further comprising receiving, from the first computing device, a first annotation representing an undetected text field in the second image data.

7. The computer-implemented method of claim 5, wherein:

the third alpha-numeric text string comprises pseudo-random characters; and the fourth alpha-numeric text string comprises pseudo-random characters.

8. The computer-implemented method of claim 5, further comprising:

saving the third image data with the third alpha-numeric text string in the first field and the fourth alpha-numeric text string in the second field as third image data, wherein the third image data represents formatting of the first image with different text strings replacing text in detected fields.

9. The computer-implemented method of claim 8, further comprising:

sending the third image data to the first computing device;

receiving, from the first computing device, a first bounding box annotation for the first field of the third image data, the first bounding box annotation labeled with a first attribute type of the first field; and receiving, from the first computing device, a second bounding box annotation for the second field of the third image data, the second bounding box annotation labeled with a second attribute type of the second field.

10. The computer-implemented method of claim 5, wherein the first alpha-numeric text string in the first sub-image comprises less than a total amount of text present in the first field of text in the first image.

11. The computer-implemented method of claim 5, further comprising:

determining geometric data representing a location of the first field of text in the first image; and generating the second image data representing the background of the first image with text removed, wherein the location of the first field of text in the second image data is determined using the geometric data.

12. A system comprising:

at least one processor; and non-transitory computer-readable memory storing instructions that, when executed by the at least one processor, are effective to cause the at least one processor to:

generate, by fragmenting a first image, a first sub-image, wherein the first sub-image includes a first segment of personally-identifiable information (PII), wherein the first segment comprises a partially-complete portion of first PII in a first field from which the first segment is determined;

generate, by fragmenting the first image, a second sub-image, wherein the second sub-image includes a second segment of PII wherein the second segment comprises a partially-complete portion of second PII in a second field from which the second segment of PII is determined;

determine a first alpha-numeric text string in the first field;

determine a second alpha-numeric text string in the second field;

send the first sub-image to a first computing device for annotation;

send the second sub-image to a second computing device for annotation;

generate, based on a combination of the first sub-image and the second sub-image, second image data representing a background of the first image with text removed;

determine first bounding box data representing a location of the first field in the second image data;

determine second bounding box data representing a location of the second field in the second image data; and generate third image data based at least in part on inserting a third alpha-numeric text string in the first field in the second image data and inserting a fourth alpha-numeric text string in the second field in the second image data.

13. The system of claim 12, the non-transitory computer-readable memory storing further instructions that, when executed by the at least one processor, are further effective to cause the at least one processor to receive, from the first computing device, a first annotation representing an undetected text field in the second image data.

14. The system of claim 12, wherein:

the third alpha-numeric text string comprises pseudo-random characters; and the fourth alpha-numeric text string comprises pseudo-random characters.

15. The system of claim 12, the non-transitory computer-readable memory storing further instructions that, when executed by the at least one processor, are further effective to cause the at least one processor to:

save the third image data with the third alpha-numeric text string in the first field and the fourth alpha-numeric text string in the second field as third image data in the non-transitory computer-readable memory, wherein the third image data represents formatting of the first image with different text strings replacing text in detected fields.

16. The system of claim 15, the non-transitory computer-readable memory storing further instructions that, when executed by the at least one processor, are further effective to cause the at least one processor to:

send the third image data to the first computing device;

receive, from the first computing device, a first bounding box annotation for the first field of the third image data, the first bounding box annotation labeled with a first attribute type of the first field; and receive, from the first computing device, a second bounding box annotation for the second field of the third image data, the second bounding box annotation labeled with a second attribute type of the second field.

17. The system of claim 12, wherein the first alpha-numeric text string in the first sub-image comprises less than a total amount of text present in the first field of text in the first image.

18. The system of claim 12, the non-transitory computer-readable memory storing further instructions that, when executed by the at least one processor, are further effective to cause the at least one processor to:

determine geometric data representing a location of the first field of text in the first image; and generate the second image data representing the background of the first image with text removed, wherein the location of the first field of text in the second image data is determined using the geometric data.

* * * * *